(12) United States Patent
Sugiyama et al.

(10) Patent No.: US 8,095,891 B2
(45) Date of Patent: Jan. 10, 2012

(54) SMART MENU APPARATUS

(75) Inventors: Nobukazu Sugiyama, San Diego, CA (US); Jaime Chee, San Diego, CA (US); Ted Dunn, Carlsbad, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 360 days.

(21) Appl. No.: 12/404,921

(22) Filed: Mar. 16, 2009

(65) Prior Publication Data

US 2010/0235791 A1 Sep. 16, 2010

(51) Int. Cl.
G06F 3/048 (2006.01)
(52) U.S. Cl. .................................. 715/825; 715/821
(58) Field of Classification Search .................. 715/821, 715/825
See application file for complete search history.

(56) References Cited

U.S. PATENT DOCUMENTS

| | | | |
|---|---|---|---|
| 5,546,522 A | 8/1996 | Nishida et al. | |
| 6,661,437 B1 | 12/2003 | Miller et al. | |
| 7,136,874 B2 | 11/2006 | Mercer et al. | |
| 7,437,358 B2 * | 10/2008 | Arrouye et al. | 1/1 |
| 7,873,622 B1 * | 1/2011 | Karls et al. | 707/707 |
| 2006/0195447 A1 | 8/2006 | Chang | |
| 2006/0195790 A1 * | 8/2006 | Beaupre et al. | 715/727 |
| 2008/0072180 A1 * | 3/2008 | Chevalier et al. | 715/861 |
| 2008/0307343 A1 * | 12/2008 | Robert et al. | 715/765 |
| 2009/0024605 A1 * | 1/2009 | Yang | 707/5 |
| 2011/0225497 A1 * | 9/2011 | Yamamoto et al. | 715/716 |

* cited by examiner

Primary Examiner — Omar Abdul-Ali
(74) Attorney, Agent, or Firm — John P. O'Banion

(57) ABSTRACT

A smart search menu is displayed on a video display unit, wherein the menu includes an accumulated search criteria list and a results list. A user's selection is input from the menu as a selected element, and, if the user has selected an element of the search criteria, then the information is output to the video display unit. By accumulating the search criteria as a list of search criteria, the user is less likely to be "lost" within the search menus, and may therefore more quickly find desired content within a content database.

24 Claims, 4 Drawing Sheets

200

Example Data

Figure 1:
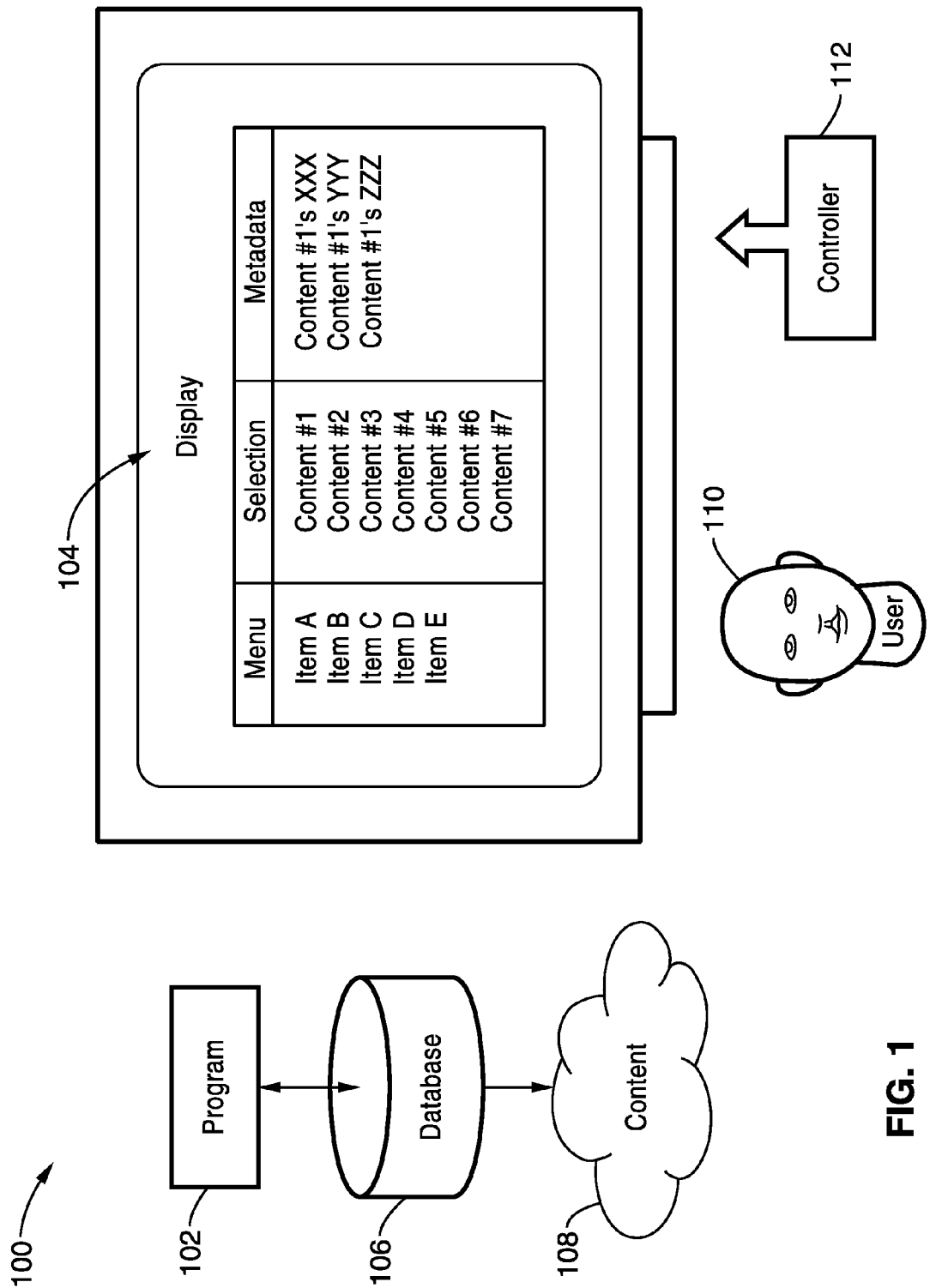

| Title | Type | Artist | Location | Date | Actor |
|---|---|---|---|---|---|
| MovieA | video | | | Date1 | Actor1 |
| MovieB | video | | | Date2 | Actor1 |
| MovieC | video | | | Date2 | Actor2 |
| SongA | audio | Artist1 | | Date3 | |
| SongB | audio | Artist2 | | Date3 | |
| SongC | audio | Artist2 | | Date4 | |
| SongD | audio | Artist3 | | Date4 | |
| PictureA | image | | Location1 | Date4 | |
| PictureB | image | | Location2 | Date5 | |

202

Example Interface

| Menu | Selection | Metadata |
|---|---|---|
| Sort by Title | PictureB | |
| Sort by Date | MovieA | |
| Audio (4) | PictureA | |
| Video (3) | SongD | PictureB's Location2 |
| Images (2) | SongC | PictureB's Date5 |
| Artist2 (2) | MovieB | |
| All Artists... | SongA | |
| Actor1 (2) | SongB | |
| All Actors... | MovieC | |

204

206 User Selects "Sort by Title"

| Menu | Selection | Metadata |
|---|---|---|
| * Sort by Title | MovieA | |
| Audio (4) | MovieB | |
| Video (3) | MovieC | |
| Images (2) | PictureA | |
| Artist2 (2) | PictureB | MovieA's Actor1 |
| All Artists... | SongA | MovieA's Date1 |
| Actor1 (2) | SongB | |
| All Actors... | SongC | |
| | SongD | |

208

210 User Selects "Audio(4)"

200

Example Data

| Title | Type | Artist | Location | Date | Actor |
|---|---|---|---|---|---|
| MovieA | video | | | Date1 | Actor1 |
| MovieB | video | | | Date2 | Actor1 |
| MovieC | video | | | Date2 | Actor2 |
| SongA | audio | Artist1 | | Date3 | |
| SongB | audio | Artist2 | | Date3 | |
| SongC | audio | Artist2 | | Date4 | |
| SongD | audio | Artist3 | | Date4 | |
| PictureA | image | | Location1 | Date4 | |
| PictureB | image | | Location2 | Date5 | |

202

Example Interface

| Menu | Selection | Metadata |
|---|---|---|
| Sort by Title<br>Sort by Date<br>Audio (4)<br>Video (3)<br>Images (2)<br>Artist2 (2)<br>All Artists...<br>Actor1 (2)<br>All Actors... | PictureB<br>MovieA<br>PictureA<br>SongD<br>SongC<br>MovieB<br>SongA<br>SongB<br>MovieC | PictureB's Location2<br>PictureB's Date5 |

204

206 — User Selects "Sort by Title"

| Menu | Selection | Metadata |
|---|---|---|
| * Sort by Title<br>Audio (4)<br>Video (3)<br>Images (2)<br>Artist2 (2)<br>All Artists...<br>Actor1 (2)<br>All Actors... | MovieA<br>MovieB<br>MovieC<br>PictureA<br>PictureB<br>SongA<br>SongB<br>SongC<br>SongD | MovieA's Actor1<br>MovieA's Date1 |

208

210 — User Selects "Audio(4)"

FIG. 2A

Example Interface

| Menu | Selection | Metadata |
|---|---|---|
| * Sort by Title<br>* Audio (4)<br>Artist2 (2)<br>Artist1 (1)<br>Artist3 (1)<br>Date3 (2)<br>All Dates... | SongA<br>SongB<br>SongC<br>SongD | SongA's Artist1<br>SongA's Date3 |

212

214 — User Selects "All Dates..."

| Menu | Selection | Metadata |
|---|---|---|
| * Sort by Title<br>* Audio (4)<br>Date3 (2)<br>Date4 (2)<br>Artist2 (2)<br>All Artists... | SongA<br>SongB<br>SongC<br>SongD | SongA's Artist1<br>SongA's Date3 |

216

218 — User Selects "Date4 (2)"

FIG. 2B

Example Interface

| Menu | Selection | Metadata |
|---|---|---|
| * Sort by Title<br>*Audio (2)<br>*Date4 (2)<br>Artist2 (1)<br>Artist3 (1) | SongC<br>SongD | SongC's Artist2<br>SongC's Date4 |

220

222 — User Selects "Audio (2)"

| Menu | Selection | Metadata |
|---|---|---|
| * Sort by Title<br>* Date4 (3)<br>Audio (2)<br>Image (1)<br>All Artists.... | PictureA<br>SongC<br>SongD | PictureA's Location1<br>PictureA's Date4 |

224

FIG. 2C

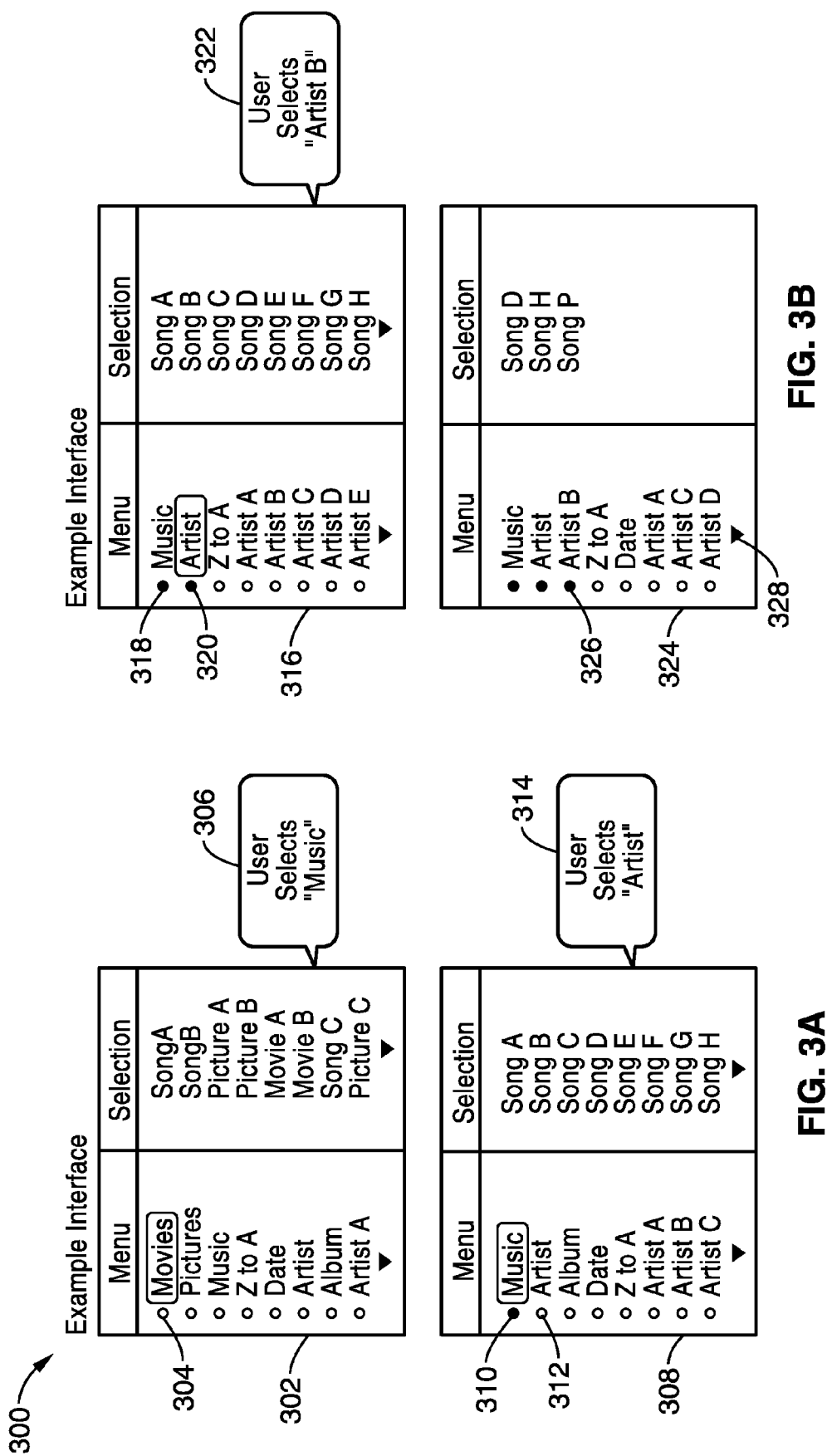

SMART MENU APPARATUS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention generally relates to making and accumulating selection criteria in a menu, and more particularly to one or more displayed selection criteria menus with results updated within the displayed menu as a result of prior menu selections, thereby requiring less cursor selection movement during the selection of stored content.

2. Description of Related Art

Traditional menu interfaces are static, with users becoming lost between several layers of user interface. Thus, it is not unusual for a user to become confused what they are looking for, or how they arrived at a given screen or search result.

BRIEF SUMMARY OF THE INVENTION

An aspect of this invention is an apparatus that may comprise: a menu displayed on a video display unit; the menu comprising: (i) a set of search criteria as a search criteria list; and (ii) a set of results as a results list; means for inputting a user's selection from the menu as a selected element; means for accessing the selected result for the user if the user has selected an element of the set of results; and means for outputting to the video display unit if the user has selected an element of the search criteria; said means for outputting comprising: (i) an updated menu reflecting the selected element from the set of search criteria, and (ii) the results of the search criteria as applied to a content database.

Another aspect of this invention is an apparatus that comprises: a menu displayed on a video display unit, wherein the menu comprises a set of search criteria as a search criteria list and a set of results as a results list; means for inputting a user's selection from the menu as a selected element; and if the user has selected an element of the search criteria, then means for outputting to the video display unit, the means for outputting comprising: an updated menu reflecting the selected element from the set of search criteria, and the results of the search criteria as applied to a content database; else if the user has selected an element of the set of results, then means for accessing the selected result for the user.

In both apparatus described above, said means for inputting the user's selections may be a device selected from a group of devices consisting of: a mouse, a keyboard, a trackball, a remote control, and a joystick. Basically, any device capable of signaling a user's intent to move a cursor and make a selection would function as a usable means for inputting the user's selections.

The device may comprise a motion output, and a selector. Here, the motion output may comprise: an up, a down, a left, a right motion output, or combinations of horizontal and vertical motion. With more advanced devices, all six degrees of motion may be used to position a viewpoint within a three dimensional space with any orientation of pitch, yaw, and roll. Certainly, subsets of the six degrees of freedom may also be used as selection devices.

The selector described above may comprise a button. Such button may be the "Enter" key or other key on a keyboard, a trackball, or depressing a scroll or trackball device. In a button-less implementation, simply hovering over a choice for a preselected period of time may constitute making the selection.

In both apparatus described above, the video display unit may be selected from a group of video display units consisting of: a television, a digital billboard, a computer monitor, a laptop monitor, a game console with a display, a cell phone comprising a display, a personal digital assistant (PDA), and a smart phone with a display.

The set of search criteria may comprise: zero or more selected search criteria in a subset of selected search criteria, and zero or more unselected search criteria in a subset of unselected search criteria.

In both apparatus above, the means for outputting may comprise: means for adding the selected element to the subset of selected search criteria; and means for removing the selected element from the subset of unselected search criteria; means for generating the updated menu set of search criteria by a combination of the subsets of the selected search criteria and the unselected search criteria; and means for applying the subset of selected search criteria to the content database, which results in the set of results.

As above, the means for inputting the user's selection may comprise: displaying on the video display unit the subset of selected search criteria, and as many of the unselected search criteria as will fit in a list on the video display unit.

Similarly, the means for inputting the user's selection may comprise: a set of selection instructions stored on a computer readable medium and executable on a computer, wherein the set of selection instructions performs steps comprising: using user cursor movements as input to move a means for highlighting from one element to another element within the menu; thereby displaying to the user, on the video display unit connected with the computer, a highlighted menu element. These executable instructions may be source code, interpreted code, or other code as ultimately understood by the computer.

The set of selection instructions may further comprise: selecting a desired menu element; and denoting the desired menu element as selected. This "denoting" step is simply the indication to the user that the selection has been made, as is commonly used with selection devices in the computer industry.

The set of selection instructions may further comprise: selecting a previously selected menu element; and denoting the previously selected menu element as deselected. In this manner a method of deselecting is used to either reduce the search elements, or undo the selection of some other menu element.

The denoting step may be selected from a group of annotations comprising: a textual marking, highlight, underline, italics, a change in font size, a change in font color, a change in font, a blinking font, and combinations of two or more of the foregoing. Here, the textual marking may be a preceding open circle "○" to denote an unselected status, or a closed circle "●" to denote a selected status.

In another aspect of the invention, a method for selecting content may comprise: displaying on a video display unit a list of selected and unselected search criteria and a list of search results; accepting user input from the list of selected and unselected search criteria; modifying the list of selected and unselected search criteria based on the user input as a modified search list; updating the list of search results based on the list of selected search criteria as a modified results list; and updating the display on the video display unit with the modified search list and the modified results list.

In the method described above, further steps may comprise: displaying metadata of a selected element in the modified results list. Here, one may also display metadata of a first element in the modified results list if the user has not yet made a selection of the selected element.

The updating the list of search results based on the list of selected search criteria may comprise: performing a content database search using the selected search criteria; and outputting the results of the search to the modified results list. The content database may have a listing of relevant metadata relating to content available to the user. Such content may be stored on a local storage device, or may be download from one or more sources, or may be DVD, CD, tape, or other remote medium storage. In yet another aspect of the invention, a broad database may be stored of available content from a service provider with a very broad selection of content, such as Netflix®. The metadata for older sources, such as tapes, may be separately downloaded, and not contained as true "metadata" within the medium of the tape.

The method for selecting media steps may be stored in a computer readable medium accessible and executable by a computer.

The content database comprises metadata may be selected from a group of content consisting of: actor, artist, album name, production location, track number, title, date, stars, costars, length, genre, rating, length, description, photograph, Universal Resource Locator (URL), music, video, PG17, PG13, Mature, Adult, Non-rated, Unrated, country, file size, and file location. Without limitation, the content database could be used to describe nearly any aspect of an item of content.

The accepting user input step may utilize a device selected from a group of devices consisting of: a mouse, a keyboard, a trackball, a remote control, and a joystick. The device may comprise: a motion output, and a selector.

The motion output may comprise: an up, a down, a left, a right motion output, or combinations of horizontal and vertical motion. In a broader implementation, the motion output could comprise one or more spatial axes, and one or more centers of rotation about the same or different axes.

The selector may comprise a button. Such button may be the "Enter,", "Select", or other such key on a keyboard, or may be the depression of a trackball, scroll bar.

In still another aspect of the invention, an apparatus may comprise: (a) a menu displayed on a video display unit; (b) said menu comprising: (i) a set of search criteria as a search criteria list; and (ii) a set of results as a results list; (c) a computer capable of performing steps comprising: (i) capturing from an input device a user's selection from the menu as a selected element; (ii) accessing the selected result for the user if the user has selected an element of the set of results; and (iii) outputting to the video display unit if the user has selected an element of the search criteria, an updated menu reflecting the selected element from the set of search criteria, and the results of the search criteria as applied to a content database.

The input device may be selected from a group of devices consisting of a mouse, a keyboard, a trackball, a remote control, and a joystick. In any of these devices repeated clicking of a key may represent a motion input. The input device may also comprise: a motion output, and a selector.

The motion output may comprise an up, a down, a left, a right motion output, or combinations of horizontal and vertical motion. Basically, any motion capable of navigating the menu and making selections of entries within the menu would be a suitable input device.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is diagram of a computer database accessed by a controlling process to display user selections in a menu, wherein the user interacts with the database to make selections with a controller that causes the menu to restructure itself as a result of prior selections and metadata content.

FIGS. 2A, 2B, and 2C display a sequence of menus, with their associated selections and corresponding metadata.

FIGS. 3A and 3B display a sequence of menus, with their associated selections, but with no corresponding metadata.

DETAILED DESCRIPTION OF THE INVENTION

Referring more specifically to the drawings, for illustrative purposes aspects of the present invention are embodied in the methods and apparatus generally shown in FIG. 1 through FIG. 3B. It will be appreciated that the apparatus may vary as to configuration and as to details of the parts, and that the method may vary as to the specific steps and sequence, without departing from the basic concepts as disclosed herein. In particular, while the description below only discusses a single user, persons skilled in the art will have little difficulty adapting to multiple users.

DEFINITIONS

The following terms are used herein and are thus defined to assist in understanding the description of the invention(s). Those having skill in the art will understand that these terms are not immutably defined and that that the terms should be interpreted using not only the following definitions but variations thereof as appropriate within the context of the invention(s).

"Metadata" means information about data. In the definition etymology "meta" means "about," so metadata means "about data," or, more specifically, "information about data." There is metadata that describes the fields and formats of databases and data warehouses. There is metadata that describes documents and document elements, such as Web pages, research papers, and so on.

For instance, in the movie "Citizen Kane®", there appears near the end a scene a now famous sled, with the name "Rosebud" painted on it. Metadata for the scene may comprise information that actor Orson Welles played the part of "Charles Foster Kane", and was also the director, as well as one of the screenplay writers along with Herman J. Mankiewicz. Metadata may also comprise the significance of the sled, symbolizing the last remaining shred of a mother's love. Such metadata, in a very full example may include a director's analysis of the psychological significance of the burning sled as the final loss of a mother's love, or the last memory of a mother's love.

"Computer" means any device capable of performing the steps, methods, or producing signals as described herein, including but not limited to: a microprocessor, a microcontroller, a video processor, a digital state machine, a field programmable gate array (FGPA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and information transmitted by electromagnetic or optical methods including, but not limited to, wireless transmission, copper wires, and optical fibers.

"Content Database" means a data structure (database) that maintains metadata information in a searchable format regarding a selection of content, the metadata information including without limitation examples such as Star Wars®, action, romance, George Clooney, George Orwell, 1941, William Randolph Hearst, James Bond®, 007®, drama, horror, PG17, and Sean Connery. The content database may itself contain a collection of organized metadata. Conceivably, preconstructed content databases of broad categories may be downloaded to initiate a local content database. It is envisioned that the content database would have linkages between an audiovisual object's metadata and terms contained within the metadata, thus, when a comparison is made with a metadata term to be searched, if a match is found, then metadata associated with the metadata term may be retrieved. For example, if Jack Nicholson is the content database term to be searched, then either a list of all extant files regarding Jack Nicholson may be retrieved, or a list of all files extant on the local computer may be retrieved.

A very simple content database would simply be lists associated with particular metadata terms to be searched, such as an action, horror, PG17, rap, hip-hop, or tango. A metadata term found in one of the lists would have the rating attribute of the list itself.

"Database" means a structured collection of data which is structured according to a database model. Without limitation, the most commonly used structure is a relational model. Ultimately, a database allows a response to an input query to be generated with meaningful data.

Typically, database linkages are traditionally supplied by background database maintenance mechanisms (e.g. SQL and the like), or may be directly coded for compactness and speed.

"TV" means television, or remote viewing. A typical TV may be a standalone receiver that receives an analog or digital signal, and processes it for viewing or listening by a user. In an alternate definition, it is a set of hardware capable of displaying the video, audio, or both signals to a viewer. Such hardware may be limited only to the viewing, hearing, or both of video signals, or may be part of a computer system capable of other uses beyond that of television reception and displaying of video, audio, or both. The television may also comprise a video monitor, an audio monitor, and a means for processing an input video stream. Shortly, all television in the United States will be broadcast in High Definition TV (HDTV). Further, such programming may be broadcast, transferred by digital or analog cable signal, or repackaged into TCPIP packets for transmission over the internet.

"Video Display Unit" or "VDU" means a display unit capable of displaying an image. The image may either be static (a picture), or dynamically changing (a video clip). Sound may or may not be present, as in an audio track where one is present. A television set (TV) may be a video display unit, as may be a smart phone display, a computer monitor, a digital billboard, a personal digital assistant (PDA), a game console, a laptop monitor, or the like. Even though a video may have an audio track, it is not necessary for the video display unit to play the audio track to the user.

"Audiovisual" input means audio input, a video input, a video input with an associated audio input (such as a typical movie), an audio input with a corresponding video display (such as a radio or other audio program), and one or more of the foregoing.

INTRODUCTION

One aspect of this invention allows for the updating of a menu based on one or more prior user inputs, as well as updating the results from the user input(s), while allowing quick navigation of the menu back to earlier choices with relatively less cursor movement.

Referring now to FIG. 1, one sees an overview of the menu system described herein 100. A controlling program 102 operates to control a video display unit menu 104 based on a database 106 that typically comprises metadata relating to content 108. The content may be available for viewing, listening, etc., or may be off line, or may be available programming from a remote source, such as a video collection, a satellite broadcasting system, or internet connected source. A user 110 interacts with the menu 104 by interacting with a controller 112 that operates to provide input to the program 102, thereby modifying and updating the menu 104.

OPERATIONAL EXAMPLE 1

Referring now to FIG. 2A, one sees a representation of the functioning of the smart menu 200. Here, example data 202 comprises without limitation typical categories, such as title, type, artist, location, date, and actor. These categories relate to content that the user may wish to play. Here, there are three movies, four songs, and two pictures, which are respectively typed as videos, audios, and images. Artist information is only available here for the songs, and location information only available for the pictures. Actor information is only available for the movies. Date information, in this example, is available for all of the content.

The example interface 204, without limitation, shows an initial starting menu, the current selections available, and various metadata relating to the selections where there such information is available. The information presented in the example interface 204 shows that the content may sorted by title, date, by audios (of which there are four), videos (of which there are 3), images (of which there are 2), by all artists available, by Actor1 (of which there are 2), or by all actors.

At this point, the user selects on the controller (typically a remote control of some type, or a keyboard on a computer), and selects "Sort by Title" 206.

The result from the Sort by Title is shown in 208, where the "Sort by Title" menu entry is preceded by an asterisk, to show that in this menu display, all of the entries have been sorted by their titles. Since the titles have now been sorted by title, their dates are no longer relevant, so the Sort by Date" menu selection has been removed.

At this point, the user selects the "Audio (4)" selection 210, which means that the user is interested in the titles of the four audio selections.

Referring now to FIG. 2B, the menu has been updated 212 to now have asterisks preceding both the "Sort by Title" and "Audio (4)" selections in the menu, with the corresponding selections of "SongA", "SongB", "SongC", and "SongD" presented. Here, "SongA", the topmost selection in the menu, has metadata present, so "SongA's Artist1" is displayed. Similarly, "SongA" has additional metadata present, so the metadata "SongA's Date3" is displayed.

At this point, the user decides to select instead the "All Dates . . . " selection 214. This user action results in the menu display 216 with asterisks preceding the "Sort by Title" and "Audio (4)". "SongA" is again the topmost selection, so metadata associated with "SongA" is displayed: "SongA's Artist1" and "SongA's Date3".

At this point, the user now decides to select "Date4 (2)" 218, which results in the updated menu 220 of FIG. 2C. Referring now to FIG. 2C, it is observed that asterisks precede "Sort by Title", "Audio (2)", and "Date4 (2)". This means that the selection results have been selected by the "Audio" category, the "Date4" category, and have been sorted by titles. The results are "SongC" and "SongD". Since "SongC" is the topmost selection, metadata associated with "SongC" is displayed, which is "SongC's Artist2" and "SongC's Date4".

From the menu of 220, the user now selects "Audio (2)" 222 which results in the repopulated menu of 224. Here, asterisks precede both "Sort by Title" and "Date4 (3)". Here, selections are "PictureA", "SongC", and "SongD". Since "PictureA" is the topmost (first) entry in the selections, metadata regarding "PictureA" is displayed: "PictureA's Location1" and "PictureA's Date4".

OPERATIONAL EXAMPLE 2

In this second operational example, a video display unit (VDU) has a database of all of the contents is available to it, for example from a home network.

Referring now for FIGS. 3A and 3B, the VDU displays search options on the left side of screen, and search results on the right side 300. Of course, the left and right hand sides may be reversed, or otherwise rearranged.

Initially, the search options are ordered as "Movies", "Pictures", "Music", "Z to A", "Date", "Artist", "Album", and "Artist A". Open circles 304 indicate that the corresponding search term has not been selected.

At this point, the user may choose to select Music 306 as the search criterion.

Once "Music" is selected, the VDU shows the results 308 on the right side, and reorders the options in the following way: "Music", "Artist", "Album", "Date", "Z to A", "Artist A", "Artist B", and "Artist C". "Movies" and "Pictures" have now been removed from the limited space of the display screen and placed unseen at the bottom of the list of search criteria 308. "Movies" and "Pictures" will not be shown again unless either the user deselects the Music criterion, or navigates the search criteria options to the very bottom, because most users would probably want to narrow down the "Music" category by some other category relating to music rather than by changing it to Pictures.

Since the "Music" search criterion has been selected, its corresponding open circle has been filled in as solid 310, with the remaining search criteria left with open circles 312 to indicate that they have not been selected as search criteria at this point.

Now, the user selects "Artist" 314 and the VDU reorders the way 316 the sequence of remaining search criteria to: "Music", "Artist", "Z to A", "Artist A", "Artist B", "Artist C", "Artist D", and "Artist E". At this point, both the "Music" and "Artist" selections are indicated as having been selected by their respective open circles filled solid 318, 320.

The User now selects the "Artist B" search criterion 322, and VDU search criteria list is modified to show: "Music", "Artist", "Artist B", "Z to A", "Date", "Artist A", "Artist C", and "Artist D" 324. Here the open circle preceding "Artist B" has been filled in solid 326 to indicate that "Artist B" is a current search criterion.

With the "Music", "Artist", and "Artist B" search criteria selected, the database of available content is searching for content that is "Music", has an "Artist", and has an artist whose name is "Artist B". The search results are shown on the right hand side of the display 324, and indicate that "Song D", "Song H", and "Song P" meet these search criteria. At this point, the user may simply select any of these three songs, or continue searching with other search criteria.

Selection may be made by navigating up, down, left, or right with traditional input devices, followed by the selection of the desired content to be played.

In this example, open circles preceded search criteria to show that they had not been selected, and filled, or solid circles in the same location indicated that the search criteria were selected. Similarly, bolding, blinking, highlighting, underlining, changing the color, or other visual methods could be used to depict an active search criterion.

Further, in this example, other metadata was not shown, perhaps due to limitations of available VDU size. Such other metadata may be present in the database, and otherwise accessible through appropriate accessing of the search selection criteria, e.g. an "info" selection, perhaps at the end of the search criteria list.

To simplify the description above, navigation buttons 328 have been shown throughout, but have not been used. Selection of such navigation devices allows otherwise inaccessible portions of search criteria and results to become accessible. When moving down in either the search criteria or result list, a vertical scrolling navigation button (not shown) would similarly become available for scrolling up a list.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus, comprising:
   (a) a menu displayed on a video display unit;
   (b) said menu comprising:
      (i) a set of search criteria as a search criteria list, said search criteria list comprising first and second search criteria, wherein the second search criteria is selectable as a subset of a first search criteria; and
      (ii) a set of results as a results list;
   (c) means for inputting a user's selection from the menu as a selected element;
   (d) means for accessing the selected result for the user if the user has selected an element of the set of results; and
   (e) means for outputting to the video display unit if the user has selected an element of the search criteria;
   (f) said means for outputting comprising:
      (i) an updated menu reflecting the selected element from the set of search criteria, the updated menu populating and reordering the selected element and search criteria in a first column;
      (ii) the results of the search criteria as applied to a content database;
      (iii) wherein the results are populated in a second column with metadata associated with the results being populated in at least a third column, the results and metadata being displayed simultaneously with the search criteria.

2. The apparatus as recited in claim 1, wherein said means for inputting the user's selections is a device selected from a group of devices consisting of a mouse, a keyboard, a trackball, a remote control, and a joystick.

3. The apparatus as recited in claim 2, wherein the device comprises:
   a motion output, and
   a selector.

4. The apparatus as recited in claim 3, wherein the motion output comprises an up, a down, a left, a right motion output, or combinations of horizontal and vertical motion.

5. The apparatus as recited in claim 3, wherein the selector comprises a button.

6. The apparatus as recited in claim 1, wherein the video display unit is selected from a group of video display units consisting of a television, a digital billboard, a computer monitor, a laptop monitor, a game console with a display, a cell phone comprising a display, a personal digital assistant (PDA), a smart phone with a display, a movie player, and an audio player.

7. The apparatus as recited in claim 1, wherein the set of search criteria comprises:
   zero or more selected search criteria in a subset of selected search criteria; and
   zero or more unselected search criteria in a subset of unselected search criteria.

8. The apparatus as recited in claim 7, wherein the means for outputting comprises:
   means for adding the selected element to the subset of selected search criteria;
   means for removing the selected element from the subset of unselected search criteria;
   means for generating the updated menu set of search criteria by a combination of the subsets of the selected search criteria and the unselected search criteria; and
   means for applying the subset of selected search criteria to the content database, which results in the set of results.

9. The apparatus as recited in claim 1, wherein the means for inputting the user's selection comprises displaying on the video display unit the subset of selected search criteria, and as many of the unselected search criteria as will fit in a list on the video display unit.

10. The apparatus as recited in claim 1, wherein the means for inputting the user's selection comprises:
    a set of selection instructions stored on a computer readable medium and executable on a computer, wherein the set of selection instructions performs steps comprising:
    using user cursor movements as input to move a means for highlighting from one element to another element within the menu;
    thereby displaying to the user, on the video display unit connected with the computer, a highlighted menu element.

11. The apparatus as recited in claim 10, wherein the set of selection instructions further comprises:
    selecting a desired menu element; and
    denoting the desired menu element as selected.

12. The apparatus as recited in claim 10, wherein the set of selection instructions further comprises:
    selecting a previously selected menu element; and
    denoting the previously selected menu element as deselected.

13. The apparatus as recited in claim 12, wherein the denoting step is selected from a group of annotations comprising a textual marking, highlight, underline, italics, a change in font size, a change in font color, a change in font, a blinking font, and combinations of two or more of the foregoing.

14. A method for selecting content, comprising:
    displaying on a video display unit a list of selected and unselected search criteria and a list of search results;
    accepting user input from the list of selected and unselected search criteria, said selected and unselected search criteria comprising first and second search criteria, wherein the second search criteria is selectable as a subset of a first search criteria;
    modifying the list of selected and unselected search criteria based on the user input as a modified search list, the modifying including reordering the selected and unselected search criteria;
    updating the list of search results based on the list of selected search criteria as a modified results list;

and updating the display on the video display unit with the modified search list and the modified results list;

wherein the modified search list is populated in a first column and the modified results list is populated in a second column with metadata associated with the results being populated in at least a third column, the modified results and metadata being displayed simultaneously with the modified search list.

15. The method as recited in claim 14, further comprising displaying metadata of a selected element in the modified results list.

16. The method as recited in claim 15, further comprising displaying metadata of a first element in the modified results list if the user has not yet made a selection of the selected element.

17. The method as recited in claim 14, wherein the updating the list of search results based on the list of selected search criteria comprises:

performing a content database search using the selected search criteria; and outputting the results of the search to the modified results list.

18. The method as recited in claim 17, wherein the search results are stored in a computer readable medium accessible by a computer.

19. The method as recited in claim 17, wherein the content database comprises metadata selected from a group of content consisting of actor, artist, album name, production location, track number, title, date, stars, costars, length, genre, rating, length, description, photograph, Universal Resource Locator (URL), music, video, PG17, PG13, Mature, Adult, Non-rated, Unrated, country, file size, and file location.

20. The method as recited in claim 14, wherein said accepting user input step utilizes a device selected from a group of devices consisting of a mouse, a keyboard, a trackball, a remote control, and a joystick.

21. An apparatus, comprising:
(a) a menu displayed on a video display unit;
(b) said menu comprising:
  (i) a set of search criteria as a search criteria list, said search criteria list comprising first and second search criteria, wherein the second search criteria is selectable as a subset of a first search criteria; and
  (ii) a set of results as a results list;
(c) a computer configured for performing steps comprising:
  (i) capturing from an input device a user's selection from the menu as a selected element;
  (ii) accessing the selected result for the user if the user has selected an element of the set of results; and
  (iii) outputting to the video display unit if the user has selected an element of the search criteria, an updated menu reflecting the selected element from the set of search criteria, and the results of the search criteria as applied to a content database, the updated menu populating and reordering the selected element and search criteria in a first column and the results in a second column with metadata associated with the results being populated in at least a third column, the results and metadata being displayed simultaneously with the search criteria.

22. The apparatus as recited in claim 21, wherein said input device is selected from a group of devices consisting of a mouse, a keyboard, a trackball, a remote control, and a joystick.

23. The apparatus as recited in claim 22, wherein the input device comprises:

a motion output, and a selector.

24. The apparatus as recited in claim 23, wherein the motion output comprises an up, a down, a left, a right motion output, or combinations of horizontal and vertical motion.

\* \* \* \* \*